United States Patent
Chan et al.

(10) Patent No.: US 6,889,375 B1
(45) Date of Patent: May 3, 2005

(54) METHOD AND SYSTEM FOR APPLICATION DEVELOPMENT

(75) Inventors: Alex Yiu-Man Chan, Sunnyvale, CA (US); David C. Lee, Sunnyvale, CA (US); Mike K. Chow, Sunnyvale, CA (US); Rohit Dewan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 571 days.

(21) Appl. No.: 09/715,978

(22) Filed: Nov. 17, 2000

(51) Int. Cl.[7] ................................................. G06F 9/44
(52) U.S. Cl. ........................ 717/123; 717/102; 717/113
(58) Field of Search ................................ 717/100–123; 379/88.17, 88.22, 88.27

(56) References Cited

U.S. PATENT DOCUMENTS

| | | | | |
|---|---|---|---|---|
| 5,455,903 A | * | 10/1995 | Jolissaint et al. | 345/835 |
| 5,734,837 A | * | 3/1998 | Flores et al. | 705/7 |
| 5,848,393 A | * | 12/1998 | Goodridge et al. | 705/8 |
| 5,918,226 A | * | 6/1999 | Tarumi et al. | 707/10 |
| 6,286,129 B1 | * | 9/2001 | Agarwal et al. | 717/105 |

OTHER PUBLICATIONS

"Developing a WFT Workflow System, WFT Version 8.0: Second Edition", Template Software Inc., 1998.*
Delano Technology Corporation; "Component Development Kit;" http://www.delanotech.com/products/development-kit.html Jun. 20 2000.
Aspect Communications; "Aspect eBusiness Architect;" http://www.aspect.com/products/ebus$_{13}$ architect/ebus.html Feb. 2, 2001.
Microsoft; "ActiveX Controls;" http://www.microsoft.com/com/tech/ActiveX.asp Jun. 20, 2000.
Sun Microsystems, Inc.; "The choice is Clear: write to the JavaBeans™ Component Architecture;" http;//www.java-soft.com/beans/index.html Jun. 20, 2000.
Edify Corporation; "Edify's Solution—Electronic Workforce (EWF);" http://www.edify.com/customer/edify_products/index.html Feb. 2, 2001.
Edify Corporation; "EWF—Workforce Application Builder;" http://www.edify.com/customer/edify_products/ewf_app_builder.html Feb. 2, 2001.

* cited by examiner

Primary Examiner—Ted T. Vo
(74) Attorney, Agent, or Firm—Baker Botts L.L.P.

(57) ABSTRACT

A system for application development is disclosed. The system includes programming entities, which include a workflow and a container. A contract specifies an interaction between at least two programming entities.

29 Claims, 4 Drawing Sheets

METHOD AND SYSTEM FOR APPLICATION DEVELOPMENT

TECHNICAL FIELD OF THE INVENTION

This invention relates generally to the field of computer systems and more specifically to a method and system for application development.

BACKGROUND OF THE INVENTION

Application designers typically need to efficiently create and edit workflows in order to design a computer application. Workflows include a directed graph of workflow steps that perform the operations of an application. Often, however, workflows cannot be readily edited, resulting in slower application development. Thus, effective application development has posed challenges for application designers.

SUMMARY OF THE INVENTION

In accordance with the present invention, a method and system for application development are provided that substantially eliminate or reduce the disadvantages and problems associated with previously developed systems and methods.

According to one embodiment of the present invention, a system for application development is disclosed. The system includes multiple programming entities: a workflow, a run-time container that executes the workflow, and a design-time container that edits the workflow. A contract specifies an interaction between at least two programming entities.

According to another embodiment of the present invention, a method for application development is disclosed. Multiple programming entities are defined: a workflow, a run-time container that executes the workflow, and a design-time container that edits the workflow. A contract specifying an interaction between at least two programming entities is also defined.

Embodiments of the invention may provide numerous technical advantages. A technical advantage of one embodiment is that contracts are used to specify interactions between a workflow and a workflow step, resulting in more efficient design of workflows. A workflow step may be used in multiple workflows, where a contract describes the behavior of the workflow step. Reusing a workflow step is more efficient than generating a new workflow step for each workflow.

Another technical advantage of one embodiment is that contracts allow a user to specify the interactions between containers and workflows. Contracts specify, for example, from where a design-time container is to retrieve a workflow step and how a run-time container is to monitor a workflow, resulting in more efficient design of workflows.

Other technical advantages are readily apparent to one skilled in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION OF THE DRAWINGS

Figure 1:
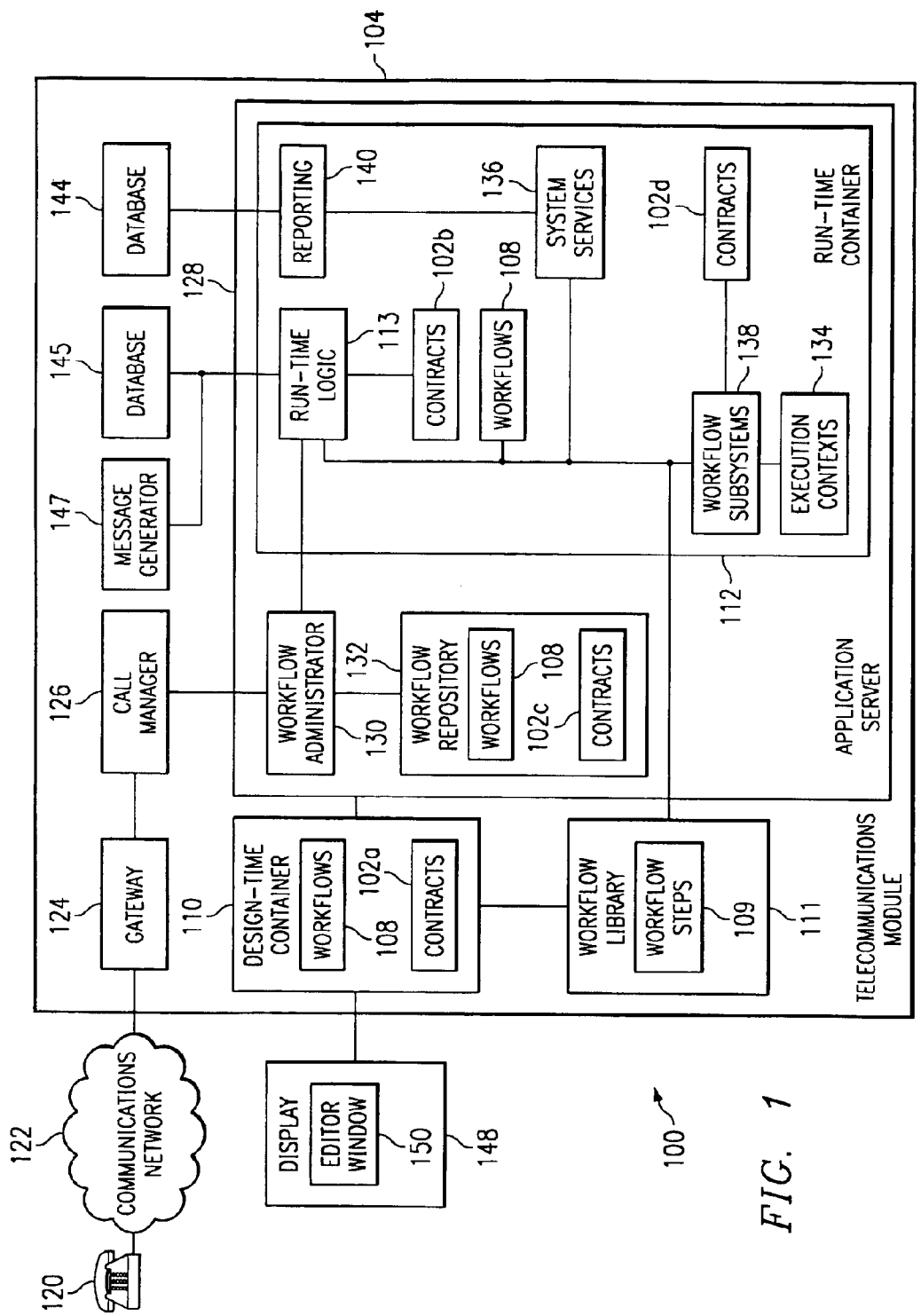
FIG. 1 is a block diagram of one embodiment of a system for designing and executing workflows.

FIG. 1 is a block diagram of one embodiment of a system 104 for designing and executing workflows 108. System 104 includes programming entities such as workflows 108, a design-time container 110, and a run-time container 112 that enable a user to design applications. A workflow 108 represents an application and includes a directed graph of workflow steps 109, where each workflow step 109 performs an operation of the application. Workflow 108 may include business logic. Design-time container 110 is used to design and edit workflows 108. Run-time container 112 is used to execute workflows 108. Contracts 102 define specific interactions between programming entities, for example, between a workflow 108 and its workflow steps 109, between containers 110 and 112 and workflows 108, and between containers 110 and 112 and workflow steps 109. Specifying interactions with contracts 102 reduces the need for describing the interactions during the design process, and allows the user to easily design new programming entities.

In one embodiment, system 104 is used to design and execute workflows 108 for managing an interactive voice response (IVR) unit. An example of a workflow 108 for managing an IVR is described in connection with FIG. 2. System 104, however, may be used for other types of workflows 108, for example, computing, production, management, financial, or other suitable workflows 108.

In one embodiment, a telecommunications device 120 communicates with system 104 through a communications network 122. Telecommunications device 120 may include, for example, a telephone, a modem, a facsimile machine, a voice response unit, or any other suitable device for communicating with system 104. Communications network 122 may include a local, wide, or global area network, a private branch exchange, a public switched telephone network, wired and/or wireless communication links, and/or any combination of the previously mentioned communication links.

System 104 includes a gateway 124, a call processing server 126, an application server 128, design-time container 110, and a workflow library 111. Gateway 124 directs signals between communications network 122 and system 104. Gateway 124 integrates resources of system 104, such as voice over Internet Protocol (IP) resources, with communications network 122. Gateway 124 may provide an Ethernet interface for connecting to a voice over packet network and/or various voice ports for connecting to telephony devices, such as plain old telephone system (POTS) device. Gateway 124 may include, for example, a Cisco access analog station gateway, a Cisco access digital trunk gateway, or a Cisco Catalyst 6000 with an analog interface module or with a T1 and services module, or any other suitable gateway. Gateway 124 may use Cisco Skinny Station Protocol, H.323 protocol, and/or Media Gateway Control Protocol, or any other suitable protocol.

Call processing server 126 provides communication services by determining whether there are any requests for service, checking instructions for setting up connections, and setting the connections accordingly. Call processing server 126 may include a Cisco Call Manager. Call processing server 126 may manage deployment of voice applications and integrate system 104 with intranet applications by using open standards such as transmission control protocol (TCP)/IP. Call processing server 126 may use a server, for example, Microsoft Internet Information Server (IIS), to allow remote administration with a standard web browser. Call processing server 126 may provide services for managing IP phones, such as matching IP addresses to specific devices and extensions, and for managing the operation of gateway 124. Call processing server 126 may support a telephony application programming interface (TAPI) and/or a Java telephony application programming interface (JTAPI) for deploying interactive voice response units and other telecommunications applications.

Design-time container 110 includes an interface used to build and edit workflows 108, and may be included in the same or different program as run-time container 112. Microsoft Windows Foundation Class or Java Foundation Class may be used by design-time container 110. The display may include a palette of workflow steps 109 that may be selected to build or edit a workflow 108 by, for example, a drag-and-drop operation. Design-time container 110 retrieves workflow steps 109 from workflow library 111 and inserts them into workflow 108 as a user designs workflow 108.

A display 148 presents icons representing workflows 108 and workflow steps 109 in an editor window 150, enabling a user to easily create and edit workflows 108. Contracts 102*a* specify interactions between design-time container 110 and workflows 108 and workflow steps 109 typically by describing service that design-time container is to provide to workflow steps 109. For example, a contract 102*a* specifies that design-time container 110 is to retrieve workflow steps 109 for workflow 108 by associating workflow 108 with the retrieval of workflow steps 109. Another contract 102*a* specifies that design-time container 110 is to retrieve input data from a user for workflow step 109 by associating workflow step 109 with the retrieval of input data.

Application server 128 provides and manages workflows 108, and may include a Windows 2000 server that runs JTAPI. Call processing server 126 and application server 128 may be implemented on the same or separate machines. Application server 128 includes a workflow repository 132, a workflow administrator 130, and run-time container 112. Workflow repository 132 stores workflows 108 and contracts 102*c* associated with the workflows. Contracts 102*c* specify interactions between workflows 108 and workflow steps 109. For example, a workflow step 109 is designed to retrieve a file and includes a file name variable. An instantiation of workflow 108, called a task, supplies the file name value to be used for the file name variable. A contract 102 specifies the file by associating the file name variable of workflow step 109 and the file name value of the task. Table 1 illustrates an example of a contract associating three variables and values.

TABLE 1

| Workflow step variable | Task value |
| --- | --- |
| server name | A |
| directory name | accounts |
| file name | 10352.db |

Workflow administrator 130 manages run-time container 112, and may be implemented using Microsoft IIS. Workflow administrator 130 retrieves workflows 108 and contracts 102*c* from workflow repository 132 and supplies workflows 108 and contracts 102*c* to run-time container 112.

Run-time container 112 includes an interface that executes workflows 108 and provides services to workflows 108 during execution. Run-time container 112 may be included in an IVR unit. Run-time logic 113 manages the operation of run-time container 112. Workflow subsystems 138 provide connections to other systems. For example, a workflow subsystem 138 receives notification of a triggering event, for example, receiving a call from telecommunications device 120. In response to receiving the triggering event, workflow subsystem 138 initiates execution of a workflow 108 and retrieves an execution context 134 for workflow 108. Contracts 102*d* typically specify the interactions of run-time container 112 and workflows 108. For example, a contract 102*d* associates receiving the triggering event with initiating workflow 108 and with retrieving execution context 134.

Run-time container 112 provides additional services to workflows 108, which are described by contracts 102*b*. Run-time logic 113 retrieves workflow step 109 from workflow library 111 in order to execute workflow 108. Contract 102*b* associates reaching a certain point of workflow 108 with retrieving workflow step 109. Run-time logic 113 also retrieves data from a database 145 in response to a workflow step 109 requesting data retrieval. Contract 102*b* associates workflow step 109 with retrieving data. Additionally, run-time logic 113 initiates message generator 147 to play messages to a caller in response to a workflow step 109 requesting the message. A contract 102*b* associates workflow step 109 with the message request.

Additionally, system services module 136 of run-time container monitors the execution of workflow 108 by, for example, recording which workflows 108 have been executed, tracing the execution of workflows 108, and/or determining any errors in the execution of workflows 108. Contract 102*b* specifies how workflows 108 are to be monitored and how monitoring information is to be recorded. For example, contract 102*b* associates the initiation of workflow 108 with tracing the execution of workflow 108 and recording the results in a reporting module 140. Reporting module 140 provides reports of workflow activities. In one embodiment, the reports may record, for example, workflow usage, the ratio of calls handled versus calls abandoned, and the average queue time for calls. Reporting module 140 receives monitoring information from system services 136 and communicates the report to a database 144. A contract 102*b* associates receiving the monitoring results of workflow 108 with placing the results in a summary form and outputting the results to database 144.

Contracts 102 also describe interactions between workflows 108 and workflow steps 109, allowing for extensibility of workflows 108. A workflow step 109 may be used in multiple workflows 108, where a contract 102 describes the behavior of workflow step 109. Reusing a workflow step 109 is more efficient than generating a new workflow step for each workflow 108. Moreover, contracts 102 allow design-time container 110 and run-time container 112 to efficiently provide services to workflows 108. Contracts specify the interaction between the containers 110 and 112 and workflows 108, reducing the need for additional description during design of workflows 108.

Figure 2:
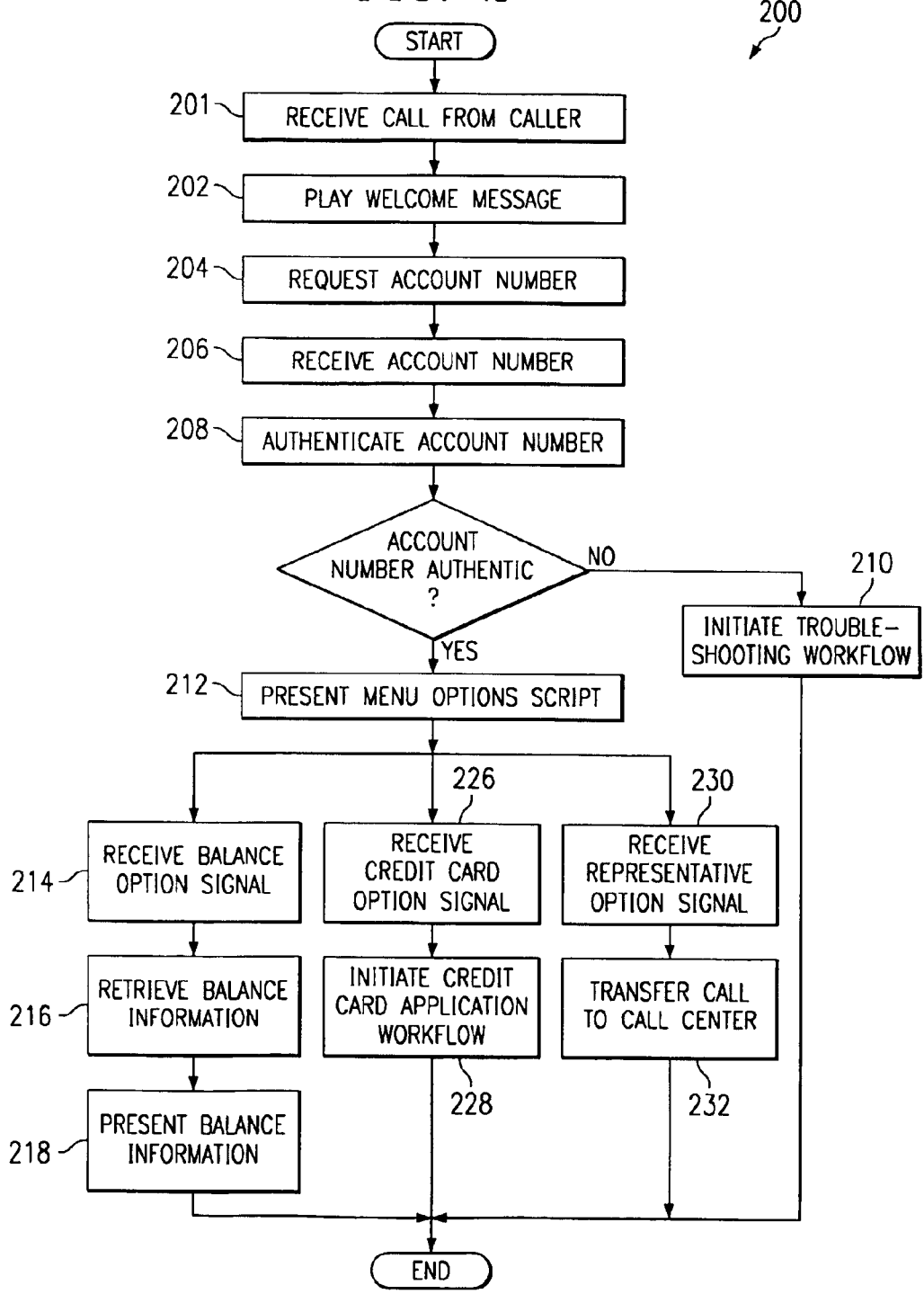
FIG. 2 is a flowchart illustrating one embodiment of a workflow that may be used in the system of FIG. 1.

FIG. 2 is a flowchart illustrating one embodiment of a workflow task 200 that may be used in system 104 of FIG.

1. Workflow task 200 is an instantiation of a workflow that describes an application that allows a caller to obtain information about a bank account from system 104. Workflow task 200 includes workflow steps 109, each of which are designed to perform an operation and may be used in multiple workflows 108. Contracts 102 associate task values and workflow step variables in order to specify the particular operation that workflow step 109 is to perform.

Workflow task 200 is initiated at workflow step 201, where system 104 receives a call from a caller using telecommunications device 120. In response, a welcome message is played for the caller at workflow step 202. Workflow step 202 is designed to retrieve and play a message and includes a message variable representing the message to play. Workflow task 200 supplies the message value indicating the specific message to be played. A contract 102 associates the variable and the value. Run-time container 112 initiates the playing of the message. A contract 102 specifies that run-time container 112 is to initiate message playing in response to workflow step 202. The welcome message requests an account number from the caller at workflow step 204. System 104 receives an account number input by caller at workflow step 206.

At workflow step 208, the account number is checked. A contract specifies that run-time container 112 checks database 145 for the account number in response to workflow step 208. If the account number is not authentic, a trouble-shooting workflow is initiated at workflow step 210. Workflow step 210 is designed to initiate another workflow, and workflow task 200 supplies the specific workflow that workflow step 210 is to initiate. A contract 102 specifies the workflow by associating a task value with a workflow step variable. After initiating the trouble-shooting workflow, workflow 200 terminates. If the account number is authentic, a menu options message is presented at workflow step 212. The menu options message instructs the caller to select a particular key of telecommunications device 120 or say a particular word in order to transmit a signal that indicates the selected option. The options may include, for example, obtaining the balance of a bank account, applying for a credit card, and transferring to a customer representative.

If system 104 receives a signal indicating that the balance option has been selected at workflow step 214, processor 130 retrieves information about the balance from database 145 at workflow step 216. Workflow step 216 is designed to retrieve a file from a database, and workflow task 200 supplies the file name and location. A contract 102 associates the file name and location with a variable of workflow step 216. A message providing the balance information is presented at workflow step 218. After completing the message, workflow 200 terminates.

It at workflow step 220 processor 130 receives a signal indicating that the credit card option has been selected at workflow step 226, a credit card application workflow is initiated at workflow step 228. Workflow step 228, which may be the same as workflow step 210, is designed to initiate another workflow. A contract specifies the workflow by associating a task value with a workflow step. After initiating the credit and application workflow, workflow task 200 terminates. If processor 130 receives a signal indicating that the customer representative option has been selected at workflow step 230, the call is transferred to an operator at workflow step 232. After the call has been transferred, workflow task 200 terminates.

Figure 3:
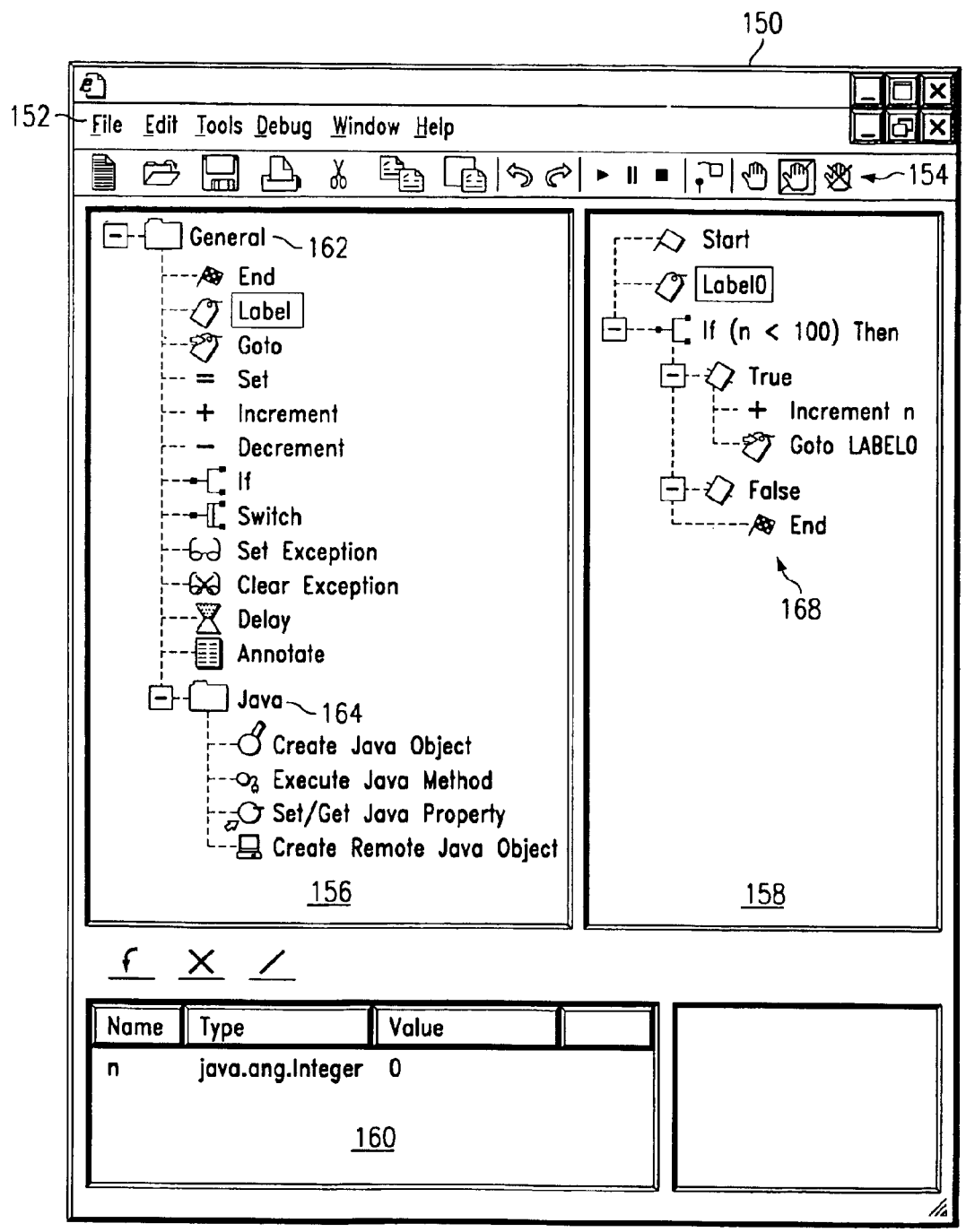
FIG. 3 illustrates one embodiment of an editor window that may be used to design workflows.

FIG. 3 illustrates one embodiment of an editor window 150 that may be used in system 104 of FIG. 1. Editor window 150 includes a menu bar 152, a toolbar 154, a palette window 156, a design window 158, and a variable window 160. Menu bar 152 includes, for example, file, edit, tools, and debug options. File options allow the user to create, edit, and save workflow designs. Edit options allow the user to edit workflows 108, for example to cut, copy, and paste workflow steps 109. The tools options include a validate feature that validates the workflow to ensure that the order and the definitions of workflow steps 109 conform with syntax rules. The debug options allow the user to test a workflow 108 on a local or remote application engine. Toolbar 154 displays buttons that activate the options of menu bar 152.

Palette window 156 provides a list of the workflow steps 109 available for designing workflows 108. Workflow steps 109 may be placed in folders to organize the steps 109. In one embodiment, a general folder 162 includes workflow steps 109 that may be used to design workflows 108 in general, and a Java folder 164 includes workflow steps 109 designed to create and manipulate Java objects. A folder of steps that may be used to design workflows for an IVR unit is described in connection with FIG. 4.

General folder 162 includes, for example, a Label step that inserts a label such as "Label 0" into a workflow 108 to identify a workflow step 109. A Goto step directs a workflow 108 to a workflow step 109 identified by a label. A Delay step delays the processing of a workflow 108 for a specified length of time. Contracts 102 specify a particular task that a workflow step 109 is to perform. For example, for a Goto step, a contract 102 specifies that workflow is directed to a workflow step 109. For a delay step, a contract 102 specifies that workflow 108 is delayed.

Java folder 164 includes, for example, a Create Java Object step that instantiates a variable or an object of a specified Java class. An Execute Java Method step executes a specified method of a Java class. As with the other workflow steps 109, contracts 102 specify the particular task that workflow step 109 performs in workflow 108.

Variable window 160 allows the user to create, edit, and view variables available for use by workflows 108 and workflow steps 109. For example, a user creates a Database Name variable. A Database Write step uses the Database Name variable to identify the database to which to store data.

Design window 158 displays an example workflow 168 that includes Label and If steps. A user builds workflow 168 by selecting the Label step from general folder 162, dragging the step to design window 158, and inserting the step into workflow 168. The drag-and-drop process allows the user to efficiently insert workflow steps into a workflow 108. A contract 102 specifies that there is an antecedent of the "if" statement, for example, n<100. A contract 102 also specifies that there is a next workflow step if the condition is true, for example, increment n and Goto Label 0, and a next workflow step if the condition is not satisfied, for example, end workflow 168.

Figure 4:
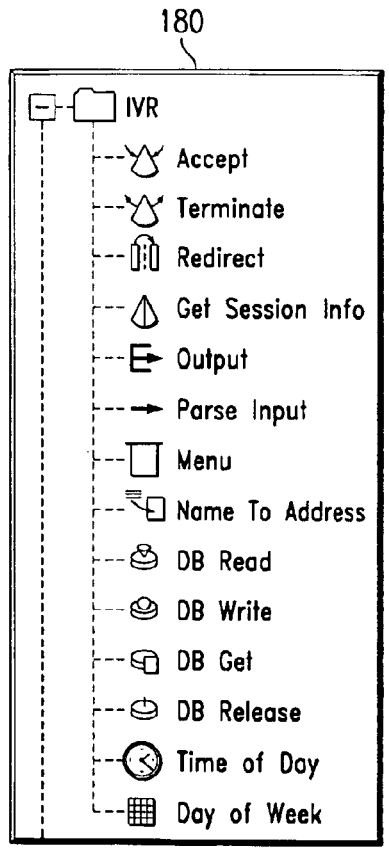
FIG. 4 illustrates a palette displaying workflow steps for workflows that manage an interactive voice response unit.

FIG. 4 illustrates palette window 150 displaying workflow steps 180 for workflows that manage a voice response unit. Workflow steps 180 include, for example, an Accept step that answers a call from call processing server 126, and a Terminate step that ends workflow 108. A Redirect step transfers a call from a current extension to a specified extension. The Redirect step has four output branches associated with a possible outcome when transferring a call: successful, when the call is successfully transferred to the specified extension; busy, when the specified extension is busy; invalid, when the specified extension does not exist; and unsuccessful, when the specified extension does not answer. The user completes a contract 102 to specify the next step for each output branch.

A Get Session Info step retrieves specified values associated with a call and stores the values in specified variables. The Get Session Info step may be used to specify different outcomes depending on the source of the call. A contract associates the values and variables. An Output step plays a message, specified by a contract, to a caller. A Parsed Input step captures the sequence of keys that a caller enters in response to a message. The Parse Input step listens for input until the user presses a terminating key, exhausts the maximum number of retries, or enters the maximum number of keys. As with other steps, contracts specify the particular tasks of the workflow steps. The user may utilize a Menu step to create a menu from which callers can select a series of options. The Menu step associates keys of telecommunications device 120 with the options in order to create the menu. A Name To Address step determines a telephone extension based on alphabetic input from a caller.

A Database (DB) Read step selects a database and enters structured query language (SQL) statements required to retrieve data. The user provides the name and location of the data to be retrieved and SQL statements required to retrieve the data from the selected database. A Database Get step assigns the retrieved data to specific variables so that the retrieved data may be used by workflow 108. A Database Release step closes the query and releases the database resources. A Database Write step stores data in a specified database.

A Time of Day step directs workflow 108 to different workflow branches depending upon the current time of day. A Day of Week step directs workflow 108 to different workflow branches depending on the current day of the week. Contracts 102 specify the particular tasks for each workflow step, allowing for efficient design of workflows.

Figure 5:
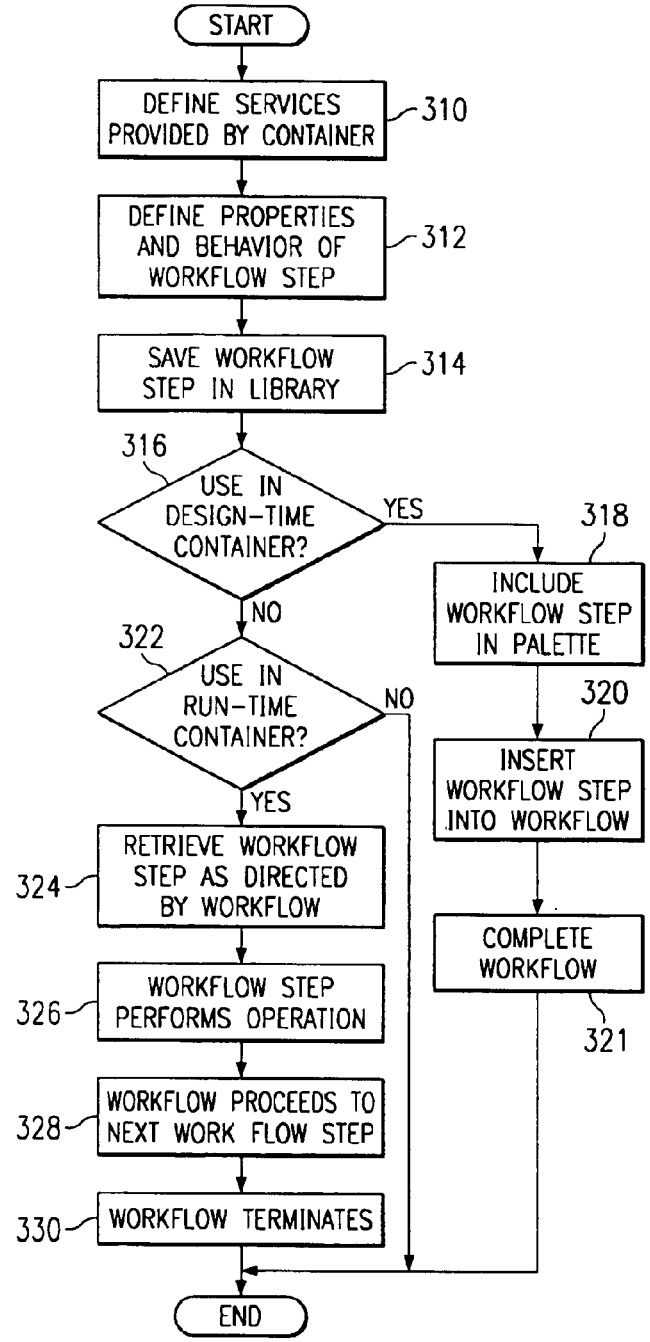
FIG. 5 is a flowchart illustrating a method for designing and executing workflows.

FIG. 5 is a flowchart illustrating a method for designing and executing workflows. The method begins at step 310, where services provided by design-time container 110 and run-time container 112 to workflows 108 are defined using contracts 102. For example, a contract 102 specifies that design-time container 110 retrieves a workflow step 109 from workflow library 111 and inserts the workflow step 109 into workflow 108. Another contract 102 specifies that system services module 136 of run-time container 112 monitors the execution of workflow 108. At step 312, properties and behaviors of workflow steps 109 are defined. A workflow step 109 may be defined for use in design-time container 110 or run-time container 112. For example, workflow step 109 is defined to retrieve account information from database 145. At step 314, workflow step 109 is saved in workflow library 111.

At step 316, the method determines whether workflow step 216 defined for design-time container 110. If workflow step 109 is for design-time container 110, the method proceeds to step 318, where workflow step 109 is included in a palette. At step 320, design-time container 110 selects workflow step 109 from the palette, and inserts workflow step 109 into workflow 108. At step 321, workflow 108 is completed, and the method terminates.

If workflow step 109 is not for design-time container 112 at step 316, the method proceeds to step 322, where the method determines whether workflow 109 is to be used in run-time container 112. If workflow step 109 is not to be used in run-time container 112, the method terminates. If workflow step 109 is to be used in run-time container 112, the method proceeds to step 324, where run-time container 112 retrieves workflow step 109 from workflow library 111. Workflow step 109 performs its defined operation, that is, retrieves account information from database 145 at step 326. Workflow 108 proceeds to the next workflow step 328. At step 330, workflow 108 terminates, and the method terminates.

Although an embodiment of the invention and its advantages are described in detail, a person skilled in the art could make various alterations, additions, and omissions without departing from the spirit and scope of the present invention as defined by the appended claims.

What is claimed is:

1. A system for application development, the system comprising:
   a plurality of programming entities comprising:
      a run-time container operable to execute a workflow, the workflow representing an application and comprising a plurality of workflow steps, each workflow step comprising a particular operation of the application, an interactive voice response unit comprising the run-time container, the workflow being operable to direct the operation of the interactive voice response unit; and
      a design-time container operable to edit the workflow; and
   a plurality of contracts, a contract specifying an interaction between a workflow step and a programming entity, the interaction comprising a service that the programming entity provides for the workflow step when the workflow step is executed, the workflow step and the contract operable to be used for a next workflow, the plurality of contracts comprising:
      a first contract specifying that the design-time container is to retrieve input data for a first workflow step when the first workflow step is executed; and
      a second contract specifying that the run-time container is to play a message in response to a triggering event for a second workflow step when the second workflow step is executed;
   the design-time container further operable to retrieve input data according to the first contract; and
   the run-time container further operable to play the message in response to the triggering event according to the first contract.

2. The system of claim 1, wherein the contract specifies a service provided by the run-time container to the workflow.

3. The system of claim 1 wherein the contract specifies a service provided by the design-time container to the workflow.

4. The system of claim 1, wherein:
   the workflow comprises a workflow step, the workflow step operable to be used in a plurality of workflows;
   the workflow step comprises a variable;
   a workflow task of the workflow provides a value; and
   the contract associates the variable with the value.

5. The system of claim 1, wherein:
   the run-time container comprises a workflow subsystem operable to retrieve an execution context for the workflow; and
   the contract specifies the execution context.

6. The system of claim 1, wherein:
   the workflow comprises a workflow step operable to direct the interactive voice response unit to play a message specified in a message variable;

a workflow task of the workflow provides a message value corresponding to the message; and the contract associates the message value with the message variable.

7. The system of claim 1, wherein:

the workflow comprises a workflow step operable to direct the interactive voice response unit to retrieve data specified in a data variable;

a workflow task of the workflow provides a data value corresponding to the data; and the contract associates the data value with the data variable.

8. A method for application development, the method comprising:

defining a plurality of programming entities comprising:
a run-time container operable to execute a workflow, the workflow representing an application and comprising a plurality of workflow steps, each workflow step comprising a particular operation of the application;
directing the operation of an interactive voice response unit using the workflow, the interactive voice response unit comprising the run-time container; and
a design-time container operable to edit the workflow; and defining a plurality of contracts, a contract specifying an interaction between a workflow step and a programming entity, the interaction comprising a service that the programming entity provides for the workflow step when the workflow step is executed, the workflow step and the contract operable to be used for a next workflow, the plurality of contracts comprising:
a first contract specifying that the design-time container is to retrieve input data for a first workflow step when the first workflow step is executed; and
a second contract specifying that the run-time container is to play a message in response to a triggering event for a second workflow step when the second workflow step is executed;

the design-time container further operable to retrieve input data according to the first contract; and the run-time container further operable to play the message in response to the triggering event according to the first contract.

9. The method of claim 8, further comprising:

defining the contract specifying a service provided by the run-time container to the workflow; and executing the workflow using the run-time container.

10. The method of claim 8, further comprising:

defining the contract specifying a service provided by the design-time container to the workflow; and editing the workflow using the design-time container.

11. The method of claim 8, further comprising defining the contract associating a variable with a value, a workflow task providing the value and a workflow step, the workflow step operable to be used in a plurality of workflows and comprising the variable.

12. The method of claim 8, further comprising:

defining the contract specifying an execution context for the workflow; and retrieving the execution context using the run-time container.

13. The method of claim 8, further comprising:

defining the workflow comprising a workflow step directing the interactive voice response unit to play a message specified in a message variable, a workflow task providing a message value corresponding to the message;

defining the contract associating the message value with the message variable; and playing the message.

14. The method of claim 8, further comprising:

defining the workflow comprising a workflow step directing the interactive voice response unit to retrieve data specified in a data variable, a workflow task providing a data value corresponding to the data;

defining the contract associating the data value with the data variable; and retrieving the data.

15. Application development software embodied in a computer-readable medium and operable to perform the following:

defining a plurality of programming entities comprising:
a run-time container operable to execute a workflow, the workflow representing an application and comprising a plurality of workflow steps, each workflow step comprising a particular operation of the application; and
a design-time container operable to edit the workflow;

directing the operation of an interactive voice response unit using the workflow, the interactive voice response unit comprising the run-time container; and defining a plurality of contracts, a contract specifying an interaction between a workflow step and a programming entity, the interaction comprising a service that the programming entity provides for the workflow step when the workflow step is executed, the workflow step and the contract operable to be used for a next workflow, the plurality of contracts comprising:
a first contract specifying that the design-time container is to retrieve input data for a first workflow step when the first workflow step is executed; and
a second contract specifying that the run-time container is to play a message in response to a triggering event for a second workflow step when the second workflow step is executed;

the design-time container further operable to retrieve input data according to the first contract; and the run-time container further operable to play the message in response to the triggering event according to the first contract.

16. The application development software of claim 15, further operable to perform:

defining the contract specifying a service provided by the run-time container to the workflow; and executing the workflow using the run-time container.

17. The application development software of claim 15, further operable to perform:

defining the contract specifying a service provided by the design-time container to the workflow; and editing the workflow using the design-time container.

18. The application development software of claim 15, further operable to perform defining the contract associating a variable with a value, a workflow task providing the value and a workflow step, the workflow step operable to be used in a plurality of workflows and comprising the variable.

19. The application development software of claim 15, further operable to perform:

defining the contract specifying an execution context for the workflow; and retrieving the execution context using the run-time container.

20. The application development software of claim 15, further operable to perform:
defining the workflow comprising a workflow step directing the interactive voice response unit to play a message specified in a message variable, a workflow task providing a message value corresponding to the message;
defining the contract associating the message value with the message variable; and
playing the message.

21. The application development software of claim 15, further operable to perform:
defining the workflow comprising a workflow step directing the interactive voice response unit to retrieve data specified in a data variable, a workflow task providing a data value corresponding to the data;
defining the contract associating the data value with the data variable; and
retrieving the data.

22. A system for application development, the system comprising:
means for defining a plurality of programming entities comprising:
a run-time container operable to execute a workflow, the workflow representing an application and comprising a plurality of workflow steps, each workflow step representing a particular operation of an application being developed; and
a design-time container operable to edit the workflow;
means for directing the operation of an interactive voice response unit using the workflow, the interactive voice response unit comprising the run-time container; and
means for defining a plurality of contracts, a contract specifying an interaction between a workflow step and a programming entity, the interaction comprising a service that the programming entity provides for the workflow step when the workflow step is executed, the workflow step and the contract operable to be used for a next workflow, the plurality of contracts comprising:
a first contract specifying that the design-time container is to retrieve input data for a first workflow step when the first workflow step is executed; and
a second contract specifying that the run-time container is to play a message in response to a triggering event for a second workflow step when the second workflow step is executed;
the design-time container further operable to retrieve input data according to the first contract; and
the run-time container further operable to play the message in response to the triggering event according to the first contract.

23. The system of claim 22, further comprising:
means for defining the contract specifying a service provided by the run-time container to the workflow; and
means for executing the workflow using the run-time container.

24. The system of claim 22, further comprising:
means for defining the contract specifying a service provided by the design-time container to the workflow; and
means for editing the workflow using the design-time container.

25. The system of claim 22, further comprising means for defining the contract associating a variable with a value, a workflow task providing the value and a workflow step, the workflow step operable to be used in a plurality of workflows and comprising the variable.

26. The system of claim 22, further comprising:
means for defining the contract specifying an execution context for the workflow; and
means for retrieving the execution context using the run-time container.

27. The system of claim 22, further comprising:
means for defining the workflow comprising a workflow step directing the interactive voice response unit to play a message specified in a message variable, a workflow task providing a message value corresponding to the message;
means for defining the contract associating the message value with the message variable; and
means for playing the message.

28. The system of claim 22, further comprising:
means for defining the workflow comprising a workflow step directing the interactive voice response unit to retrieve data specified in a data variable, a workflow task providing a data value corresponding to the data;
means for defining the contract associating the data value with the data variable; and
means for retrieving the data.

29. A system for application development, the system comprising:
a plurality of programming entities comprising:
a workflow step operable to:
direct an interactive voice response unit to play a message specified in a message variable;
direct the interactive voice response unit to retrieve data specified in a data variable;
a workflow representing an application and comprising the workflow step, the workflow step comprising a particular operation of the application;
a workflow task providing a message value corresponding to the message and a data value corresponding to the data;
a run-time container operable to execute the workflow;
a design-time container operable to edit the workflow;
a plurality of contracts, a contract associating:
the message value with the message variable; and
the data value with the data variable, the contract specifying an interaction between the workflow step and the run-time container, the interaction comprising a service that the run-time container provides for the workflow step when the workflow step is executed, the workflow step and the contract operable to be used for a next workflow, the plurality of contracts comprising:
a first contract specifying that the design-time container is to retrieve input data for a first workflow step when the first workflow step is executed; and
a second contract specifying that the run-time container is to play a message in response to a triggering event for a second workflow step when the second workflow step is executed;
the design-time container further operable to retrieve input data according to the first contract; and
the run-time container further operable to play the message in response to the triggering event according to the first contract.

* * * * *